United States Patent [19]

Renn et al.

[11] Patent Number: 4,952,686

[45] Date of Patent: Aug. 28, 1990

[54] SOLUBLE DRIED CASSIA ALLOY GUM COMPOSITION AND PROCESS FOR MAKING SAME

[75] Inventors: Donald W. Renn, Glen Cove; George E. Lauterbach, Thomaston, both of Me.; Peter Hemmingsen, Hvidovre, Denmark

[73] Assignee: FMC Corporation, Philadelphia, Pa.

[21] Appl. No.: 127,347

[22] Filed: Dec. 1, 1987

[51] Int. Cl.$^5$ .................... C07G 17/001; C08B 37/00
[52] U.S. Cl. ...................... 536/114; 536/52; 514/54; 426/573; 426/658
[58] Field of Search ............ 536/52, 114; 514/54, 514/57; 426/573, 658

[56] References Cited

U.S. PATENT DOCUMENTS

| | | | |
|---|---|---|---|
| 2,963,373 | 12/1960 | Monti et al. | 426/575 |
| 3,042,668 | 7/1962 | Monti et al. | 536/114 |
| 3,748,201 | 7/1973 | Jordan | 149/108.8 |
| 3,808,195 | 4/1974 | Shelso et al. | 536/52 |
| 4,256,875 | 3/1981 | Gabriel et al. | 536/4.1 |
| 4,363,669 | 12/1982 | Cottrell et al. | 536/114 |
| 4,368,324 | 1/1983 | Bayerlein et al. | 536/114 |
| 4,645,833 | 2/1987 | Bayerlein et al. | 536/17.1 |
| 4,661,475 | 4/1987 | Bayerlein et al. | 514/54 |
| 4,720,389 | 1/1988 | Clare et al. | 426/329 |
| 4,746,528 | 5/1988 | Prest et al. | 536/114 |
| 4,753,659 | 6/1988 | Bayerlein et al. | 536/114 |

FOREIGN PATENT DOCUMENTS 0494068  6/1953  Canada .................. 536/114

OTHER PUBLICATIONS

Webster's Ninth New Collegiate Dictionary (1986) p. 72.

*Primary Examiner*—Ronald W. Griffin
*Assistant Examiner*—Nancy S. Carson
*Attorney, Agent, or Firm*—Richard E. Elden

[57] ABSTRACT

A process and composition is provided for a hydratable, alloy gum composition of Cassia gum and another gelling and thickening agent which composition is capable of forming a clear, stable colloidal solution. The compositions are usually more easily dispersed in an aqueous solution than either component alone. An alloy gum composition of Cassia gum and xanthan gum is particularly useful for absorbing an aqueous medium.

24 Claims, No Drawings

SOLUBLE DRIED CASSIA ALLOY GUM COMPOSITION AND PROCESS FOR MAKING SAME

A homogeneous composition and process is provided for an alloy gum extracted from seeds of the genus Cassia which will form a clear, stable colloidal solution in an aqueous medium.

The demand for natural gums, polysaccharides, used in gelling and thickening compositions, has been increasing worldwide. Many of these natural gums are derived from plants, and as a result both the availability and the properties of these gums are subject to wide variations year-to-year. Recently it has been proposed that the seeds of plants of the genus Cassia could be utilized as a new source of natural galactomannan gums (Farooqi et al., "Seeds of Genus Cassia as Possible Sources of Industrial Gums," *Indian Forester*, November 1978, pages 729–732).

U.S. Pat. No. 4,661,475 discloses that galactomannan gums are useful substances which are added to an aqueous medium in order to achieve the desired consistency or viscosity. Like virtually all natural gelling agents and thickeners with the exception of gelatin, galactomannan gums are derivatives of polysaccharides, that is, high-polymeric carbohydrates.

Polysaccharides are water-soluble or strongly swellable substances, and include compounds which in aqueous systems give colloidal, more or less highly viscous solutions or dispersions having plastic or pseudo-plastic flow and having functional properties such as a thickening action, water-binding capacity, stabilization of suspensions and emulsions in polyphase systems, and gel formation.

Galactomannans, like the starches, are vegetable reserve polysaccharides. They occur in the endosperm cells of numerous seeds of legumes. The collective term "galactomannan" or "polygalactomannan" comprises all polysaccharides which are built up of galactose and/or mannose residues and in addition can also contain minor amounts of other sugar residues. There is a relatively large number of galactomannans, which vary in composition depending on their origin. The materials principally occur in the endosperm portions of legumes such as guar, locust bean, tara, honey bean, flame tree and sesbania. Galactomannans are built up of a linear mannose chain which itself is built up of mannopyranose rings linked by $\beta$-(1,4)-glucoside bonds. To these rings are attached, as branches, isolated galactopyranose residues by $\alpha$-(1,6)-glucoside bonds. Galactomannan gums when dried and ground to a powder are well known to be particularly difficult to disperse into an aqueous solution and instead clump together, according to U.S. Pat. No. 3,808,195.

In particular, locust bean gum, guar gum and tara gum have been the principal galactomannan gums of commerce. Cassia species contain potentially useful endosperm galactomannans analogous to locust bean gum, tara gum, and guar gum. Cassia gum, like locust bean gum, exhibits gel strength synergy with carrageenan, xanthan, and agar according to U.S. Pat. No. 4,661,475. However, it has been found that unlike other galactomannan gums, the Cassia gum when dried to a solid fails to redissolve completely in water. When the solid is dispersed in water and heated, a portion will redissolve, but a substantial part will only imbibe water and swell. The mixtures may sometimes appear to be clear solutions until examined closely, and on standing the solutions become cloudy.

Cassia gum can be extracted from Cassia seeds, preferably the meal or solvent-washed meal of the ground seeds, by use of water or aqueous solutions at a variety of temperatures, reagent concentrations, and the like. These freshly extracted solutions do not contain insoluble, swollen particles and do not develop a haze on standing. The residual insolubles can be removed, by conventional methods, such as centrifuging and/or filtering. The resulting solutions, when processed to a solid state, fail to fully dissolve. Dry mixing ground Cassia gum with other reagents (like sorbitol, sucrose, inorganic salts, or other gelling and thickening agents) yields a two phase mixture from which the Cassia gum fails to dissolve in an aqueous medium completely. The resulting aqueous composition appears to be a suspension or dispersion of insoluble swollen particles within the solution which do not eventually dissolve. The resulting aqueous composition, if originally clear, forms a haze on standing. This haze is accelerated by heating and appears to be caused by a white film surrounding the insoluble, swollen particles. This haze makes it undesirable for dried Cassia gum formulations to be employed when product clarity is important. Further, the insoluble portion of the Cassia gum is no longer available to gel or impart viscosity to an aqueous medium.

It is undesirable to be required to prepare fresh Cassia gum extract from ground Cassia seed meal because of the inconvenience of the extra steps, extracting the Cassia gum from the seeds and separating the extract from the spent meal, because of the need to dispose of the spent meal, and because of the variability of the gum content of the meal.

The present invention is an alloy gum composition comprising galactomannan gum extracted by an aqueous medium from seeds of the genus Cassia coprecipitated with a solubilizing quantity of a gelling and thickening agent selected from the group consisting of carrageenan, furacellaran, agar, agarose, agaropectin, dextran, xanthan, algin, carboxymethylcellulose, gellan, low methoxyl pectin, hydroxyethylcellulose, locust bean gum, deacetylated chitin, polyacrylamide, polyethylene glycol and polyvinyl alcohol to form a solid alloy gum composition capable of being rehydrated to form a substantially clear, stable colloidal aqueous solution. The alloy gum composition is prepared by extracting seeds of the genus Cassia with an aqueous medium to form a soluble extract portion of galactomannan gum, an insoluble residue portion, optionally separating the soluble extract portion from the insoluble residue portion, incorporating into the soluble extract portion a solubilizing quantity of said gelling and thickening agent and coprecipitating therefrom an alloy gum composition capable of being rehydrated to form a substantially clear, stable colloidal aqueous solution, optionally containing the insoluble residue portion.

For some applications it is desirable to include inert materials into the alloy gum composition such as gelling or thickening agents which do not form an alloy gum when coprecipitated with a Cassia seed extract or other inert materials, such as the insoluble residue portion of extracted Cassia seeds. In such a case it is not necessary to separate the extract portion from the insoluble residue portion of the Cassia seeds or meal (or of the coextracted). However, for the purpose of describing the properties of the alloy gum compositions it is preferable to separate the insoluble residue portion from the soluble extract portion prior to coprecipitating the alloy gum conposition. The scope of the present invention is intended to include the alloy gums and the process of producing them whether or not inert materials are incorporated therein.

The term "gelling and thickening agent" as used herein includes polysaccharide gums, hydrocolloids, which are compounds yielding a gel on combination with water, and/or compounds which in aqueous systems give colloidal, more or less highly viscous solutions or dispersions having plastic or pseudo-plastic flow including properties such as a thickening action, water-binding capacity, stabilization of suspensions and emulsions in polyphase systems, and gel formation.

The term "solution" as used herein is a homogeneous composition and includes a gel or colloidal dispersion in a medium which does not contain a substantial quantity of a persistently insoluble polysaccharide gum portion and which does not form a haze on standing.

The term "homogeneous" as used herein comprises a single phase of matter which is uniform in chemical composition. A homogeneous composition includes alloy gums comprising two or more chemically different compounds such as a galactomannan gum and a xanthan gum as distinguished from a two phase physical mixture of a galactomannan gum and a xanthan gum. A homogeneous composition of a polysaccharide gum coprecipitated with one or more gelling and thickening agents selected from the group consisting of carrageenan, furacellaran, agar, agarose, agaropectin, dextran, xanthan, algin, carboxymethylcellulose, gellan, low methoxyl pectin, hydroxyethylcellulose, locust bean gum, deacetylated chitin, polyacrylamide, polyethylene glycol and polyvinyl alcohol is termed an alloy gum.

Water-soluble Cassia gum can be extracted with an aqueous medium by conventional methods, preferably from the meal or solvent-washed meal of ground Cassia seeds. The extraction temperature can range from the freezing point to the boiling point of the aqueous medium. Elevated temperatures of 40° C. 100° C. are desirable. The residual insolubles can be separated by centrifuging, filtering or the like. The aqueous medium may comprise water or aqueous solutions containing salts or other compounds.

Any seeds of the genus Cassia may be employed as the source of Cassia gum, *Cassia tora* and *Cassia occidentalis* are preferred because of their commercial availability.

Cassia meal can also be coextracted with gelling and thickening agents in the crude form. For example, Cassia meal can be coextracted with locust beans or an alkali-modified ground seaweed powder which releases carrageenan when mixed with heated aqueous solutions.

At least one gelling and thickening agent may be incorporated into the aqueous medium prior to, during or after extracting the Cassia gum from the Cassia seed. However, unless a gelling and thickening agent selected from carrageenan, furacellaran, agar, agarose, agaropectin, dextran, xanthan, algin, carboxynethylcellulose, gellan, low methoxyl pectin, hydroxyethylcellulose, locust bean gum, deacetylated chitin, polyacrylamide, polyethylene glycol and polyvinyl alcohol is incorporated into the extract of the Cassia seed meal prior to coprecipitating the aqueous extract, the resulting Cassia gum composition will usually fail to redissolve to form a solution.

Although the exact proportion of Cassia gum and the gelling and thickening agent employed in the present invention can be varied over a wide range generally it requires at least one part by weight of the gelling and thickening agent to about four parts by weight Cassia gum to be a solubilizing quantity. If less than 0.2 parts by weight of Cassia gum is employed per part by weight of the gelling and thickening agent, the composition may be too reduced in Cassia gum to exhibit sufficient synergy to be considered a Cassia alloy gum composition. Other gums and hydrocolloids such as guar gum and tara gum can be incorporated into the alloy gum composition but do not appear to enhance the solubilizing of the Cassia gum composition.

One unexpected benefit of the Cassia alloy gum compositions of the present invention is that many of the gelling and thickening agents, and in particular, galactomannan gums, when added to an aqueous solution as a powder have a tendency to "clump". If the gum is soluble these clumps will gradually disappear together with any temporary haze which might be observed. The Cassia alloy gum compositions of the present invention appear to have a significantly decreased tendency to form clumps compared to the gelling and thickening agents alone. This increased dispersion ability has been observed in particular with Cassia alloy gum compositions containing xanthan, algin, gellan, hydroxyethylcellulose and polyacrylamide. This property provides an added utility for the Cassia alloy gum compositions.

An additional unanticipated property is the high water absorptivity of solid Cassia:xanthan alloy gum compositions whether in the form of a powder, a fibrous coprecipitate or as a continuous film. A 50:50 Cassia:xanthan alloy gum powder (about equal parts by weight) has been found to absorb up to 1,000 times its weight of distilled water and, according to an external evaluation, the dry fibers absorb 50 times their weight of human urine, compared with 25 times the weight absorbed by a starch-polyacrylamide graft copolymer used as a control.

The solid Cassia alloy gum compositions of the present invention can be coprecipitated or separated from the aqueous extract by any convenient method. When carrageenan is the gelling and thickening agent, the Cassia alloy gum composition can be precipitated with potassium ions (KCl). In general, any alloy gum composition can be coprecipitated by evaporating the aqueous medium or by adding a water-miscible organic solvent to form a precipitate or coagulum which can be separated from the liquid by filtering or centrifuging. Isopropanol is the preferred water-miscible solvent. The coprecipitated wet homogeneous solids can be dried in a vacuum or with hot air.

The properties of some alloy gums appear to differ somewhat after precipitation and drying depending on the treatment or by pretreatment employed, such as alcohol pretreatment of Cassia meal prior to extraction, or air drying instead of vacuum drying the precipitated alloy gum. These minor differences in property can be determined by one skilled in the art without undue experimentation.

The best method for practising the present invention will be clear to one skilled in the art from the following nonlimiting examples.

EXTRACTION

Unless otherwise specified an aqueous extract of Cassia gum was prepared by adding 1.0 g of Mucilose 39H (Diamalt AG, Munich) Cassia meal to 100 ml of water, the mixture stirred and brought to boiling using a microwave oven. After heating for 1 hour at about 85° C., 2.5 g of filter aid was added, the mixture stirred to completely disperse the filter aid, then pressure filtered (20 psi) through filter paper. The filtrate (85 ml) was combined with a 25 ml hot water wash.

PRECIPITATION WITH AN ORGANIC AND DRYING

The extract was precipitated by adding twice the volume of 99% isopropanol (2-propanol) with stirring. The coagulum was collected by filtration through a nylon cloth, squeezed, then suspended in 100 ml 80% 2-propanol (aq.) as a wash, collected, then dried in a 60° C. forced-air oven, ground to 40 mesh to yield 0.34 g of a tan powder, (34% yield). When 100 mg was dispersed in 10 ml of distilled water and heated to boiling, a light brown mass of swollen particles in a viscous solution was observed by examining with an oblique light. Upon standing, this material developed an opalescent haze, which could be attributed to a coating around the swollen, undissolved particles.

Alcohol-washed Cassia meal (Diamalt AG) resulted in nearly white material with similar properties.

TESTING PROCEDURES

The Breakforce Value is the numerical value given for gel strength. In determining gel strength, the gel is cast in a 70×50 mm crystallizing dish, then the dish containing the gel placed on a scale. A plunger with a 1 $cm_2$ area is driven electrically into the gel at constant rate. The value recorded on the scale at which the plunger breaks through the surface of the gel is the Breakforce Value (gel strength) and reported as $g/cm^2$.

"Solubilizing Effect" is determined by comparing the light scattered by a solution or gel of Cassia gum alone and an equivalent alloy gum. Usually a range of alloy gum compositions is employed of 25:75, 50:50 and 75:25 by weight. Results are reported on a semi-quantitative scale of strong, medium and weak.

EXAMPLE 1

Coprecipitation with Carrageenan using Potassium Chloride

An aqueous extract of Mucilose 39H extract was obtained by heating a 2% slurry in water at about 90° C. for two hours, then filtering. A filtrate containing 0.71% 2-propanol insolubles and a 90° C. viscosity (Brookfield) of 25 mpa.s was obtained. The carrageenan used was a plant extract containing 2.42% 2-propanol precipitables, 30 mpa.s viscosity. This and the Cassia extract were combined to form five gum compositions which were coprecipitated (1:4) in 3% KCl (aq.) and the Cassia alloy gum recovered.

The gel strengths are reported in Table I.

EXAMPLE 2

Coprecipitation with carrageenan in 2-propanol (a) Fifty ml of Cassia aqueous extract filtrate was added to 25 ml of an aqueous solution of 0.25 g of kappa-carrageenan, the mixture was stirred, heated to 60° C. and the mixture recovered as a homogeneous composition by filtration, then precipitated in 2-propanol. The dry Cassia alloy gum powder was readily completely soluble in hot water, remained clear, and formed a clear gel upon cooling. The approximate gum ratio composition of the coprecipitated recovered powder was 1 part Cassia gum:1 part carrageenan extract.

(b) A series of experiments were run to determine maximum synergy ratios and minimum carrageenan necessary in the coprecipitate to facilitate solubility. Forty grams of the Cassia meal was extracted in 4 liters of water. Based on a control sample, the Cassia extract was 0.7%. Using this value, sufficient kappa-carrageenan was dissolved in the Cassia extract to form a series of compositions and the gel strength was determined. The solutions were coagulated in 2-propanol and the coprecipitates recovered as in Example 2(a). Results are presented as Table II.

EXAMPLE 3

Coprecipitation with xanthan in 2-propanol

Eight grams of alcohol-washed Cassia meal (Diamalt AG) was slurried with 800 ml of water, extracted at 80° C. for one hour, then 25 g filter aid added and the mixture pressure filtered (10–45 psi). The filtrate was divided into four parts, with the first precipitated in two volumes of 91% 2-propanol (aq.), washed and dried (60° C). Recovery:0.81 g. Sufficient xanthan (Kelco "Keltrol T,") was added to the other three portions (0.27 g, 0.81 g, 2.43 g, respectively) to give compositions having 100:0, 75:25, 50:50 and 25:75 ratios of Cassia:xanthan by weight. These were precipitated with 2-propanol as described for the control, dried, and ground. Properties were determined. The 75:25 sample was substantially soluble with the 50:50 and 25:75 fully soluble. The results are presented as Table III.

The dry powder and the dry coagulum fibers of the 50:50 Cassia:xanthan compositions were extremely water absorbent, with the powder taking up 1,000 times its weight of distilled water (forming a clear swollen particle mass), less of 1% NaCl (aq.) - showing ionic strength dependency. Continuous films prepared from a hot solution of the 50:50, then dried, readily absorbed distilled water, and became hydrated.

Many gels fracture after at least one freeze-thaw cycle, releasing the fluid used to make up the gel. This is particularly troublesome in some applications as the freeze-thaw cycle destroys the gel structure. Gels having freeze-thaw stability are very uncommon. Unexpectedly, gels of 50:50 Cassia:xanthan are freeze-thaw stable.

EXAMPLE 4

Coprecipitation with agar

Following the procedure described in Example 3, substituting agar (Bacto Difco) for xanthan, coprecipitated samples containing a constant 2% gum were prepared and tested.

From the results appearing in Table IV, it is obvious that Cassia extract could be a valuable diluent for agar, imparting significant synergistic added gel strength as well as solubilizing the Cassia gum. Without synergy effects the gel strength of samples b, c and d would be expected to be 115, 230 and 345 respectively.

EXAMPLE 5

Cassia compositions

Homogeneous aqueous compositions were produced in weight ratios of 75:25; 50:50 and 25:75 of Cassia gum and other gelling and thickening agents. Results are presented as Table V. Cassia alloy gums were precipitated with isopropanol unless otherwise indicated.

Solubilizing effect summarizes in semi-quantitative terms the solubility of the Cassia gum alloy compared with the Cassia gum alone.

Gel synergy is considered to be present if the gel strength of the alloy gum is greater than the individual gums. As some gums do not form a gel (gel strength is zero) the gel synergy is reported on a semi-quantitative scale.

Gel synergy was observed in some homogeneous compositions similar to the known locust bean gum synergy with kappa-carrageenan, xanthan and agar. The known synergy with locust bean gum is included in Table V for convenience to illustrate the present invention.

Not shown in Table V are similar Cassia compositions with other galactomannans, guar and tara. These two galactomannans do not have a synergistic effect with Cassia gum.

TABLE I

EXAMPLE 1-GEL STRENGTH

| Sample | Weight Ratio Cassia:Carrageenan | Gel Strength g/cm$^2$ |
|---|---|---|
| a | 0:100 | 990 |
| b | 9:91 | 1,325 |
| c | 19:81 | 1,910 |
| d | 31:69 | 1,885 |
| e | 46:54 | 1,960 |

TABLE II

GEL STRENGTH OF DRIED CASSIA: CARREGEENAN ALLOY GUM COMPOSITION

| Sample | a | b | c | d | e | f | g | h | i | j | k | l |
|---|---|---|---|---|---|---|---|---|---|---|---|---|
| % Cassia | 100 | 90 | 85 | 80 | 70 | 60 | 50 | 40 | 30 | 20 | 10 | 0 |
| % carrageenan | 0 | 10 | 15 | 20 | 30 | 40 | 50 | 60 | 70 | 80 | 90 | 100 |
| 2% Gel strength (g/cm$^2$) | — | 170 | 518 | 456 | 667 | 1216 | 1940 | 1830 | 1868 | 1779 | 1501 | 1357 |
| Fully Soluable | no | no | no | yes | yes | yes | yes | yes | yes | yes | yes | yes |

Sample g (50:50) exhibited a gelling temperature of 42° C. and a melting temperature of 68° C.

TABLE III

GEL STRENGTH OF CASSIA:XANTHAN GUMS

| Sample | a | b | c | d | e |
|---|---|---|---|---|---|
| % Cassia | 100 | 75 | 50 | 25 | 0 |
| % Xanthan | 0 | 25 | 50 | 75 | 100 |
| 1.5% Viscosity (75° C.) (mpa.s) | 75 | 2000 | 1700 | 2300 | 2600 |
| 2% Gel strength (g/cm$^2$) | 0 | 106 | 412 | 457 | 0 |

(Gels were very elastic)

Sample c (50:50) exhibited a gelling temperature of 57.0° C. and a melting temperature of 59.0° C.

TABLE IV

GEL STRENGTH OF CASSIA:AGAR GUMS

| Sample | a | b | c | d | e |
|---|---|---|---|---|---|
| % Cassia | 100 | 75 | 50 | 25 | 0 |
| % Agar | 0 | 25 | 50 | 75 | 100 |
| Gel strength (g/cm$^2$) | 0 | 270 | 702 | 1392 | 460 |

TABLE V

SOLUBILITIES AND/OR SYNERGISTIC EFFECTS OF COMPOSITIONS OF CASSIA GUM ALLOYS WITH COMMON GELLING AND THICKENING AGENTS

| Alloy agent | Solubilizing Effect | Synergy with Cassia | Synergy with Locust Bean Gum |
|---|---|---|---|
| Kappa A-H carrageenan | strong | v. strong | strong |
| Kappa A-H carrageenan (air dried) | strong | strong | — |
| HWG kappa-carrageenan | strong | v. strong | — |
| Furcellaran | strong | v. strong | — |
| Iota carrageenan | strong | none | none |
| Sodium lambda carrageenan | medium | none | none |
| Agar | strong | v. strong | strong |
| Agarose (SeaKem$^R$ LE) | medium | none | none |
| Agaropectins | strong | none | none |
| SeaPlaque$^R$ agarose | weak (25:75 only) | none | none |
| Xanthan (Keltrol T) | strong | v. strong | strong |
| Xanthan (Keltrol T) (air dried) | strong | strong | — |
| Xanthan (M.Colloids) | strong | v. strong | — |
| Algin (Kelmar) | strong | strong | none |
| Carboxymethyl-celluose | strong | medium | none |
| Gellan (Kelco) | strong | none | none |
| Low methoxyl pectin | medium | none | none |
| Hydroxyethylcellulose | strong | medium | none |
| Deacetylated chitin | medium | none | none |
| Polyacrylamide (NPlO) | strong | none | none |
| Dextran | medium | none | none |
| Polyethylene glycol (6000) | medium | none | none |
| Polyvinyl alcohol | medium | none | none |
| Clarified locust bean gum | medium | none | — |
| Clarified locust bean gum/carrageenan mixture | strong | strong | — |

Note: In the cases of xanthan, algin, gellan, HEC, and Cassiapolyacrylamide extract coprecipitated powders, dispersion was significantly improved over the gum by itself.

We claim:

1. A solid alloy gum composition comprising galactomannan gum extracted by an aqueous medium from seeds of the genus Cassia coprecipitated with a solubilizing quantity of a gelling and thickening agent selected from the group consisting of carrageenan, furacellaran, agar, agarose, agaropectin, dextran, xanthan, algin, carboxymethylcellulose, gellan, low methoxyl pectin, hydroxyethylcellulose, locust bean gum, deacetylated chitin, polyacrylamide, polyethylene glycol and polyvinyl alcohol to form a solid alloy gum composition which forms a substantially clear, stable colloidal aqueous solution on rehydration.

2. The alloy gum composition of claim 1 wherein up to about 4 parts by weight of galactomannan gum extracted from seeds of the genus Cassia is present per part by weight of the gelling and thickening agent.

3. The alloy gum composition of claim 1 wherein the gelling and thickening agent is carrageenan.

4. The alloy gum composition of claim 2 wherein the gelling and thickening agent is carrageenan.

5. The alloy gum composition of claim 1 wherein the gelling and thickening agent is xanthan.

6. The alloy gum composition of claim 2 wherein the gelling and thickening agent is xanthan.

7. The alloy gum composition of claim 1 wherein the gelling and thickening agent is agar.

8. The alloy gum composition of claim 2 wherein the gelling and thickening agent is agar.

9. The alloy gum composition of claim 1 wherein the gelling and thickening agent is hydroxyethycellulose.

10. The alloy gum composition of claim 2 wherein the gelling and thickening agent is hydroxyethylcellulose.

11. The alloy gum composition of claim 1 comprising at least one additional gelling and thickening agents.

12. The alloy gum composition of claim 2 comprising at least one additional gelling and thickening agent.

13. A process for producing a solid hydratable alloy gum composition comprising galactomannan gum extracted from Cassia seeds and a gelling and thickening agent selected from the group consisting of carrageenans, furacellaran, agar, agarose, agaropectins, dextran, xanthan, algin, carboxymethylcellulose, gellan, low methoxyl pectin, hydroxyethylcellulose, locust bean gum, deacetylated chitin, polyacrylamide, polyethylene glycol, and polyvinyl alcohol, the alloy gum composition which forms a substantially clear, stable colloidal aqueous solution, the process comprising: extracting seeds of the genus Cassia with an aqueous medium to form a soluble extract portion and an insoluble residue portion, incorporating into the soluble extract portion a solubilizing quantity of said gelling and thickening agent and coprecipitating therefrom a solid alloy gum composition which forms a substantially clear, stable colloidal aqueous solution on rehydration.

14. The process of claim 13 wherein the alloy gum is coprecipitated by incorporating a sufficient quantity of a water-miscible solvent into the soluble extract portion to form a coagulum in a supernatant liquid and drying the separated coagulum.

15. The process of claim 14 wherein the water-miscible solvent is isopropanol.

16. The process of claim 13 wherein the gelling and thickening agent is carrageenan and the soluble extract portion is coprecipitated with potassium ions, separating the precipitate from the soluble extract and drying the separated precipitate.

17. The process of claim 13 wherein the alloy gum is coprecipitated by evaporating the aqueous medium.

18. The process of claim 13 wherein the insoluble residue portion is separated from the soluble extract portion prior to coprecipitating the alloy gum.

19. The process of claim 14 wherein the insoluble residue portion is separated from the soluble extract portion prior to coprecipitating the alloy gum.

20. The process of claim 15 wherein the insoluble residue portion is separated from the soluble extract portion prior to coprecipitating the alloy gum.

21. The process of claim 16 wherein the insoluble residue portion is separated from the soluble extract portion prior to coprecipitating the alloy gum.

22. The process of claim 17 wherein the insoluble residue portion is separated from the soluble extract portion prior to coprecipitating the alloy gum.

23. A homogeneous solid alloy gum composition which absorbs at least 50 times its weight of an aqueous fluid comprising about equal parts by weight of galactomannan extracted from seeds of the genus Cassia and a xanthan gum.

24. The process of producing a solid alloy gum composition which absorbs at least 50 times its weight of an aqueous fluid comprising extracting seeds of the genus Cassia with an aqueous medium to produce an aqueous solution of galactomannan solids, separating the aqueous extract portion from the extracted seeds, incorporating into the aqueous extract portion about one part by weight of xanthan gum per part by weight of galactomannan solids, and coprecipitating the alloy gum.

* * * * *

UNITED STATES PATENT AND TRADEMARK OFFICE
CERTIFICATE OF CORRECTION

PATENT NO. : 4,952,686

DATED : August 28, 1990

INVENTOR(S) : Donald W. Renn, George E. Lauterbach and Peter Hemmingsen

It is certified that error appears in the above-identified patent and that said Letters Patent is hereby corrected as shown below:

Column 3, line 41, "40°C. 100°C." should read --40°C to 100°C--; line 61, "carboxynethylcellulose," should read --carboxymethylcellulose,--. Column 5, line 32, "$cm_2$ area" should read --$cm^2$ area--. Column 9, line 17, "agents." should read --agent.--. Column 10, line 1, "supernatant liquid and drying" should read --supernatant liquid, separating the coagulum from the supernatant liquid and drying--.

Signed and Sealed this

Eighteenth Day of February, 1992

Attest:

HARRY F. MANBECK, JR.

*Attesting Officer*  *Commissioner of Patents and Trademarks*